United States Patent
Rhee et al.

(10) Patent No.: US 10,977,659 B2
(45) Date of Patent: Apr. 13, 2021

(54) REAL-TIME MONITORING SYSTEM

(71) Applicants: Peter Rhee, San Mateo, CA (US); Edmar Soriano, Newark, CA (US); Alexander Campbell, Daly City, CA (US)

(72) Inventors: Peter Rhee, San Mateo, CA (US); Edmar Soriano, Newark, CA (US); Alexander Campbell, Daly City, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 497 days.

(21) Appl. No.: 15/853,378

(22) Filed: Dec. 22, 2017

(65) Prior Publication Data
US 2019/0197541 A1    Jun. 27, 2019

(51) Int. Cl.
| | |
|---|---|
| *G06Q 40/06* | (2012.01) |
| *G06Q 20/40* | (2012.01) |
| *G06Q 20/10* | (2012.01) |
| *H04W 4/14* | (2009.01) |
| *G06F 11/30* | (2006.01) |
| *G06F 16/23* | (2019.01) |
| *G06Q 20/20* | (2012.01) |

(52) U.S. Cl.
CPC ....... *G06Q 20/407* (2013.01); *G06F 11/3034* (2013.01); *G06F 16/23* (2019.01); *G06Q 20/10* (2013.01); *G06Q 20/20* (2013.01); *G06Q 20/401* (2013.01); *G06Q 20/405* (2013.01); *H04W 4/14* (2013.01)

(58) Field of Classification Search
CPC ........ G06Q 40/00; G06Q 20/10; G06Q 20/20; G06Q 20/401; G06Q 20/405; H04W 4/14; G06F 16/23; G06F 11/3034
See application file for complete search history.

(56) References Cited

U.S. PATENT DOCUMENTS

| | | | |
|---|---|---|---|
| 8,285,643 B2 * | 10/2012 | Isaacson | G06Q 20/105 705/41 |
| 8,676,704 B2 | 3/2014 | Ledbetter et al. | |
| 2013/0144785 A1 * | 6/2013 | Karpenko | G06Q 20/20 705/44 |
| 2014/0330713 A1 | 11/2014 | Isaacson et al. | |

OTHER PUBLICATIONS

Antonella et al.; Introducing ATMs in India: a contexual inquiry; Nov. 3, 2003; Elsevier, web, 30-39 (Year: 2003).*

* cited by examiner

*Primary Examiner* — I Jung Liu
(74) *Attorney, Agent, or Firm* — Loeb & Loeb LLP

(57) ABSTRACT

A systems of servers and algorithms allows merchants to refund value, for example, for refunds on returned goods or for other customer satisfaction reasons. The system receives the request for credit from a merchant refund session as well as a target financial instrument associated with the customer receiving the credit. The system then creates a specialized monitor for the customer's transactions to identify transactions made with that merchant and applies the previously credited funds for purchases made at the merchant. These credits may be made in real time at the register during a purchase or via a statement credit. The credit may also be applied to partner brands associated with the merchant by expanding the scope of the monitor.

9 Claims, 5 Drawing Sheets

REAL-TIME MONITORING SYSTEM

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

When a product is returned to a merchant, several physical processes occur. Unused and undamaged merchandise may be returned to the shelves while other items may be returned to a manufacturer or sent to a reseller. The purchaser's funds may be returned via a cash or may be returned to the card used to make the purchase. In many cases, such as when no receipt is available, the merchant may wish to limit the refund to store credit, that is, credit that can only be used at that merchant. Cash refunds require cash on hand and increase the risk of fraudulent transactions. Further cash refunds provide no mechanism for store credit. Similarly, value returns made to the card used for the original purchase do not restrict use of the refunded amount only to the merchant where the original purchase was made.

In prior eras store credit was made via a voucher. More recently, gift cards may be used to provide a store credit. However, customers often lose or forget gift cards which can cause customers to become frustrated. Gift cards may also raise escheatment issues. Store credit may be given via a receipt and code but this has the same drawbacks as a gift card.

SUMMARY

Features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

In some embodiments, a system of specially programmed servers and algorithms allows a merchant to award funds to a customer by flagging the customer's primary credit card (or similar financial instrument) so that future purchases made at that merchant may draw down the stored credit amount as a statement credit or instant savings. In this way, store credit is automatically available to the customer whenever a future purchase is made at the merchant. Because the store credit is actually funded by the merchant, escheatment complications may be reduced because no third parties hold the funds on behalf of the customer.

Further, the system may allow real time acknowledgement of the use of the store credit by generating information that can be sent to the customer via a text message, email, social media message, or other communication.

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

Figure 1:
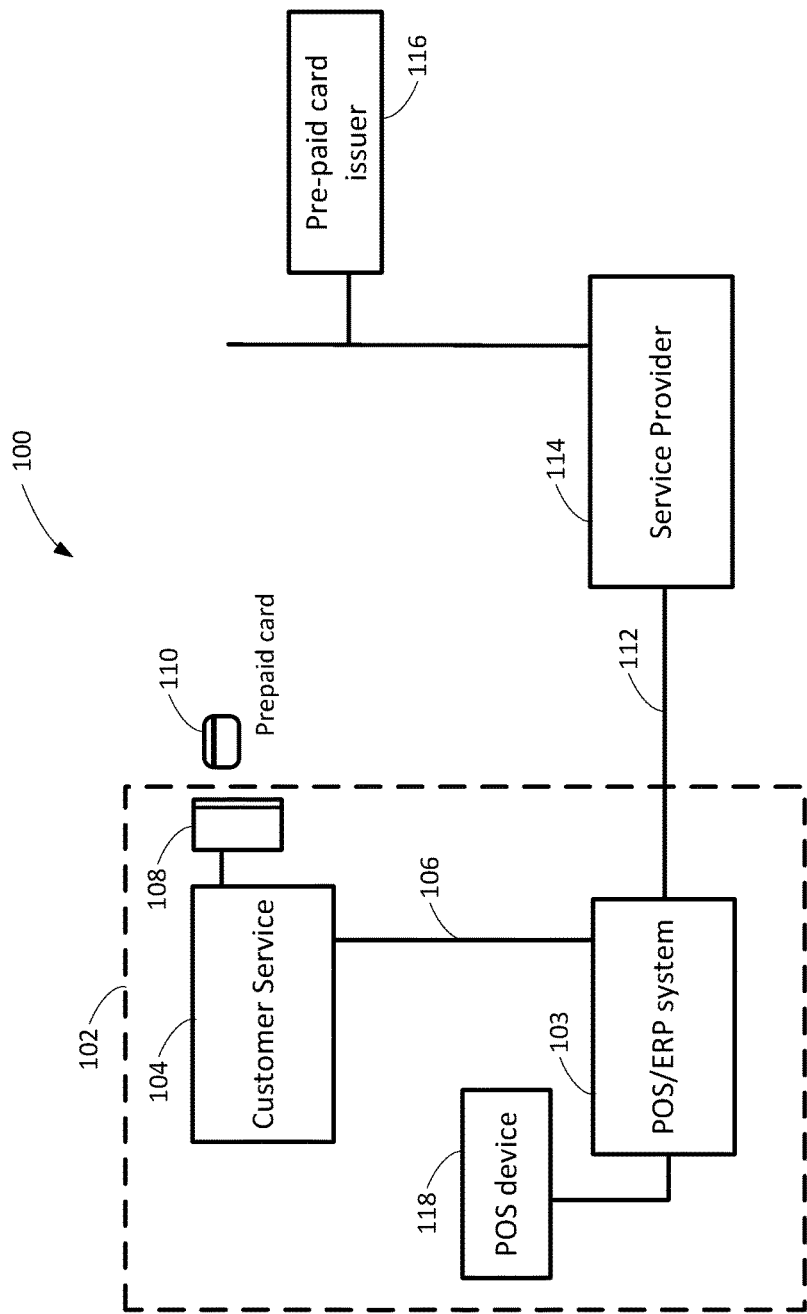
FIG. 1 illustrates a block diagram of prior art system elements for providing a store credit.

FIG. 1 is an illustration of a prior art system 100 that is used to provide a store credit to a customer using a merchant system 102. The merchant system 102 may include a point of sale (POS) system 103 coupled to a customer service terminal 104 by a network connection 106. The POS system 103 may include or be coupled to enterprise resource planning (ERP) functions such as inventory control, payroll, sales tracking, etc. In this illustration, the POS system 103 is be coupled to one or more POS devices 118 that are used to perform checkout functions for retail, in-person, sales. The customer service terminal 104 may be used to provide store credit for returned items or for other customer satisfaction purposes. As discussed above, cash refunds may be made, but a merchant may prefer to refund in store credit so that the revenue represented by the original purchase will remain with the retailer via a future sale. This may be particularly true when a return is made without a receipt or other proof that the returned goods were actually purchased at the merchant by the customer.

In this scenario, a swipe device 108 may be used to activate a prepaid card 110 (i.e. a closed loop card) via service provider 114 at a pre-paid card issuer 116. The service provider 114 may be an acquirer or a processor that receives transaction information, provides clearing and settlement services, or other transaction-related services. The prepaid card issuer 116 may receive the refund from the merchant and hold the value of the prepaid card 110. When the user swipes the prepaid card, the prepaid card issuer 116 approves the transaction and delivers the funds back to the merchant during a settlement process. In the case where the prepaid card funds do not cover the cost of the transaction, the customer may have to provide a second card or cash to cover the remaining balance.

The merchant system 102 may be connected to the service provider 114 via a private network 112 or a virtual private network offering a high security connection for privacy and tamper-resistance. The same or a similar network 112 may connect the service provider 114 to the issuer 116.

Also as discussed above, the system 100 may require that the customer retain and remember to use the prepaid card 110 when making a purchase with the merchant or an affiliate. The customer may be required to use the prepaid card 110 in a timely manner before any service fees are accumulated that reduce or eliminate the value assigned to the card. Because the prepaid card 110 is anonymous, should the prepaid card 110 be lost or stolen, its associated value may also be lost, at least to the person to whom it was issued, but perhaps not to a person who subsequently uses the prepaid card 110. This situation represents a double liability to the merchant—the original customer may be upset that the value was lost and in some regard blame the merchant, while the merchant or issuer 116 is still liable for the remaining value on the lost card.

Other existing refund transactions include the return of value to the card by which the original purchase was made. For a variety of reasons, such a transaction may not address the interests of the merchant, the customer, or both. For example, a refund of value to the original card is virtually the same as a cash refund, which the merchant may be unwilling to provide, as discussed above. Also, the customer may have his or her own reasons for not wanting value returned to the original card, such as a change in preference to a different card or the item returned was a gift and the original card is not available.

Figure 2:
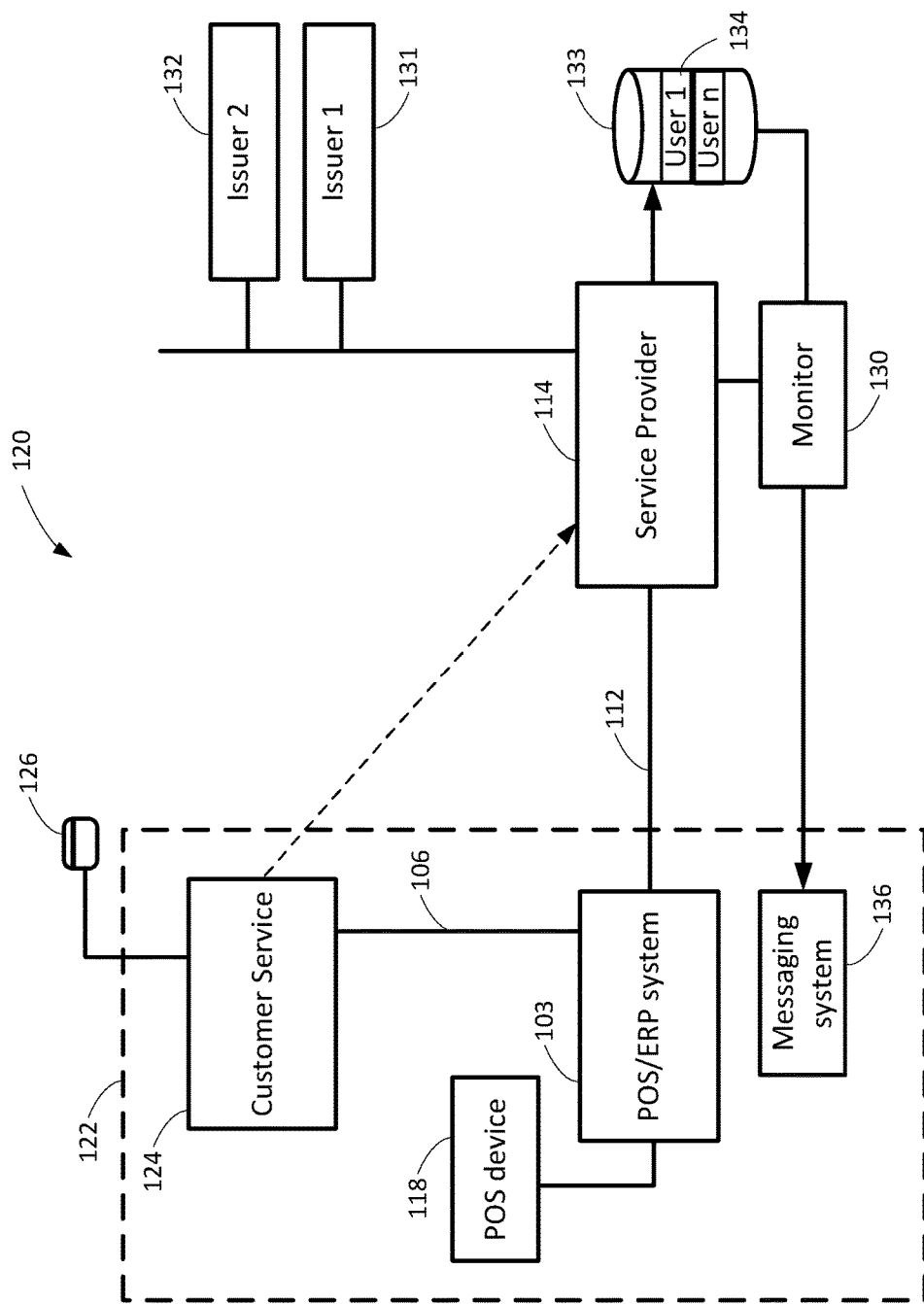
FIG. 2 is a block diagram illustrating a store credit system in accordance with the current disclosure.

FIG. 2 is a block diagram that may represent a system 120 that provides a solution to the problems associated with using prepaid cards 110 to provide refunds to customers. Additional elements of the system 120 described below may provide for both the merchant-specific use of refunded value and an automatic application of funds whenever the user performs a transaction with the merchant or an authorized affiliate. Further, the system 120 may increase protection of merchants from fraudulent refunds and protects customers from the risk of lost or stolen prepaid cards or receipt codes because the merchant actually retains the funds, i.e. credit, associated with the transaction and because the funds are associated with a customer's PAN. For example, a person attempting to gain funds through a fraudulent return may not want his or her primary open loop card associated with the fraud because discovery of the fraud would lead directly to the offender. Further, the same person might not want to risk associating the store credit with a stolen card because the card might be canceled at any moment.

The system 120 may include a merchant system 122 that is explained further below. The system 120 may also include the service provider 114 which may be an acquirer or a processor that receives transaction information, provides clearing and settlement services, or other transaction-related services with the same and/or expanded functionality as that discussed above.

A monitor 130 may screen transactions being processed by the service provider 114. The monitor 130 may be coupled to a database 133 that may store credit value information 134 for one or more users as well as data related to conditions for using the stored value. In various embodiments, the monitor 130, database 133, or both may be part of the service provider's domain. In other embodiments, these elements may be independently operated. One or more issuers 131, 132 may issue, among other financial instruments, open loop cards for credit and debit services as are normally provided to its card holders. In the described embodiment, the issuers 131, 132 may not be a party to the application of store credit to a transaction other than the ultimate settlement.

The merchant system 122 may include, as above, a POS device 118 and a POS system 103. In an embodiment, these two elements of the merchant system 122 may be the same the prior art system in order to increase backwards compatibility and reduce installation costs.

A customer service terminal 124 may be capable of providing prior art prepaid cards 110 but may also be modified as described more below to allow a customer to provide a physical card 126 or card personal account number (PAN) using a card swipe, tap, or, dip or manual entry of a PAN or other financial instrument identifier. The customer service terminal 124 may also include custom software and/or hardware that allows use of new transaction classes tailored to the return process including both user interface elements and transaction processing elements. This process may create in essence a direct message to the service provider 114 that allows the service provider to create a ledger-type entry of the credit amount to be associated with cardholder PAN and the merchant.

In another embodiment, card, i.e., PAN, may be enrolled via an online transaction. For example, if an online purchase is returned in-store or shipped back to the merchant, the customer may designate an open loop card to be associated with the store credit. The merchant may maintain a website where the customer can enter card details or may have a kiosk in-store where the card may be scanned, swiped or dipped after the user enters verification data. In an embodiment, the customer may be given a refund code for use when enrolling the open loop card. Unlike a credit code, the refund code may only be used to associate the store credit with a user's actual card so fraudulent redirection of the value by any means would be easily traced to a card in the possession of the perpetrator. Of course, other mechanisms for effecting an online refund may be supported that result in value being associated with the customer's open loop card.

The card 126 may be an existing card of the customer's, for example, an open-loop credit or debit card or similar financial instrument offered through one of the issuers 131, 132. The card may be a physical object such as a plastic card that resembles a traditional credit card or may be a virtual card that is an electronic representation on a computing device that is capable of interfacing with the various networks in the system 120.

In operation, a merchant may offer a store credit to a customer. The store credit may be related to a return on a previously purchased item, as an alternative to cash back related to a previous transaction, or for another customer satisfaction reason, such as a delay in receiving an item or post application of a discount. The customer service terminal 124 may enter the amount of store credit to be provided to the customer. In an embodiment, the process may involve use of a custom transaction code supported by the service provider 114. After the credit amount has been entered, the customer may indicate an open loop credit or debit card with which the credit may be associated by, for example, reading the card at the customer service terminal with a scan, swipe, dip, or manual entry. In one embodiment, the customer may be given a code or website that can be used by the customer to enter the open loop card at a later time. The merchant may further specify during the store credit transaction which merchant, e.g., brand or brands, for which the refund is to be available. In an embodiment, special programming of the customer service terminal 124 may allow different brands to be specified for a particular credit amount. For example, a refund on a returned item may limited to the branded store where the item was purchased while a credit made to address a customer satisfaction issue may be open to a family of associated brands.

The customer service terminal 124, in an embodiment, via the POS system 103, may then submit the store credit transaction to the service provider 114. The service provider 114, or monitor 130, may accept the store credit transaction and store the credit amount, the merchant (brand), PAN and any other restrictions or information, such as a cell phone number of the customer, in the database 133. When necessary, a new account entry may be created for the customer to accommodate the customer's personal data and associated transaction ledger data. It may be noted that actual funds may not be transferred at this time, only the data associated with the store credit. Only as the transactions are qualified and the store credit is applied, for example, via a statement credit, are the funds transferred from the merchant during settlement.

After this initial data entry, the monitor 130, as discussed more below, may review authorization, clearing, and settlement streams for a transaction that matches the terms of the store credit. For example, the database can be searched for components of the transaction including the required merchant, the required PAN, and value in the customer's refund account 134. When a refund account is identified that matches these criteria, the monitor 130 may mark the transaction and post a credit to the customer's credit card with the matching PAN, while reducing the value in the refund amount by the amount of the purchase, up to the value in the account. In an embodiment, this credit may be made in real time during the processing of the transaction so that the credit is realized at the POS device 118 during the purchase. In another embodiment, the credit may be made in the form of a statement credit as part of the customer's normal credit card billing cycle.

The monitor 130 may also be connected to a messaging system 136. The messaging system as illustrated in FIG. 2 may be part of the merchant system 122 but in other embodiments the messaging system 136 may be operated by the service provider 114 or an outside service (not depicted). In an embodiment, data provided by or known about the customer may include contact information such as an email address, a mobile phone number, or another communication channel such as a merchant smartphone app. In such a case, the monitor 130 may communicate a signal to the messaging system 136 which in turn may notify the customer of an event. The event may include activation or enrollment of the original store credit, a current or recent purchase eligible for store credit, or exhaustion of the balance of store credit. In this way, the merchant may be able to reinforce the brand message at multiple times over the course of applying, using, and retiring the store credit.

To utilize the store credit, the customer may not be required to do anything other than use the open-loop card with which the credit was associated to make a purchase at the designated merchant or brand. Because no actual value may be transferred until settlement, the issuer 131 may not be aware of the application of the credit value to the purchase until the transaction is cleared prior to the customer statement being prepared. That is, the application of the store credit may not involve pre-purchase transfer of value either from the merchant to the service provider 114 or the issuer 131, unlike prior art store credit solutions.

Figure 3:
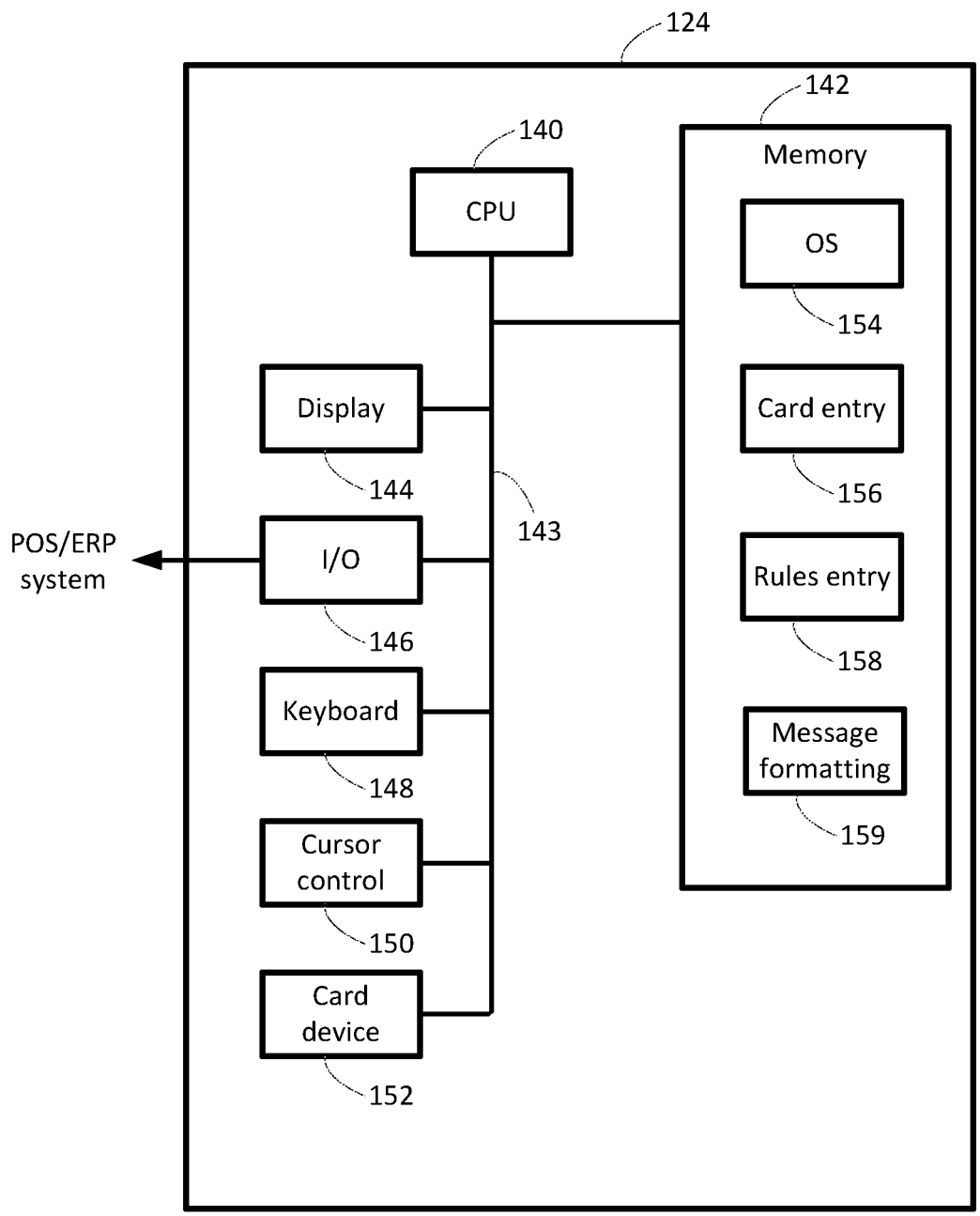
FIG. 3 is a block diagram illustrating a customer service terminal in accordance with the current disclosure.

FIG. 3 is a block diagram of one embodiment of the customer service terminal 124 illustrating one embodiment suitable for use in the system 120. A central processing unit (CPU) 140 may execute instructions stored in a memory 142. The CPU 140 and memory, as well as other peripheral devices may be connected via a data bus 143. The customer service terminal 124 may have peripheral devices including a display 144, an input/output (I/O) unit 146, a keyboard or other user interface input element such as a cursor control device 150 such as a touchpad or mouse, and, in an embodiment, a card device 152. The display 144 may present data to a user such as a customer service person and/or a customer. The display 144 may include a touchscreen so that persons interacting with the customer service terminal 124 may be able to input data via the touchscreen or a different peripheral. In an embodiment, the display 144 may mounted on a swivel so that the display 144 may be rotated for viewing by and/or interaction with a customer.

The I/O unit 146 may be a network interface card or a section of a processor that supports communication between the terminal 124 and external systems, in particular the POS system 103. The I/O unit 146 may be or include a network interface card supporting IEEE 802.x communication protocols, such as 802.3 for wired Ethernet communication and 802.11 for wireless (WiFi) communication. The keyboard 148 may provide for manual data entry of text, for example, entry of customer data, capture of return information, or manual entry of PAN data for the customer's open loop card.

The cursor control device 150 may be a mouse or touchpad that allows the operator (customer service person or customer) to move a data entry point on the display 144. A card device 152 may allow a customer to dip, tap, or swipe his or her card in order to associate that card's PAN with the refund transaction.

The memory 142 may contain executable code in several categories. In one category may be code modules, such as an operating system 154, that provide generic functionality to the customer service terminal 124. The operating system 154 may support communication functions between internal and external peripheral and devices, may support memory management, and may support basic input/output functions such as the ability to display text and graphics and receive user input. Other code modules may support custom functions that differentiate the customer service terminal 142 from a generic computer. Such code modules may include a card entry module 156, a rules capture module 158, and message formatting 159.

The card entry module 156 may support interactions with the card device 152, for example, supporting collection of PAN and/or token information from a customer's open loop card 126. The card entry module 156 may accept more than simply a PAN, such as from reading a magnetic strip. For example, when the card 126 is a chip card, the card 126 may generate a cryptogram associated with the credit return function that card entry module 156 may capture for use by in an authorization message to the service provider 114.

As discussed more below, rules or algorithms may be used to define the environment for which the credit may be used. These rules may include what merchant or store brands may be used for qualifying purchases, purchase limits, day-of-week or time-of-day limits, etc., The rules entry module 158 may be used to guide a customer service representative through entry of the refund and generation of corresponding rules, such as those just mentioned.

A message formatting module 159 may ensure that a refund message that will ultimately be processed by the service provider 114 has all required data and that the data is correctly formatted. For example, when using a tokenized PAN, a cryptogram may be required to be included in the message, where a PAN taken from a magnetic strip may not have a cryptogram. The message formatting module 159 may identify the specific type (or sub-type) of stored credit message and apply the appropriate syntax rules for constructing the appropriate message.

The customer service terminal 124 may provide an experience not found in a prior art terminal 104. The terminal 124 may support additional features and functions such as a new store credit transaction that may involve both entry of a PAN as well as entry of rules governing use of the stored credit.

Figure 4:
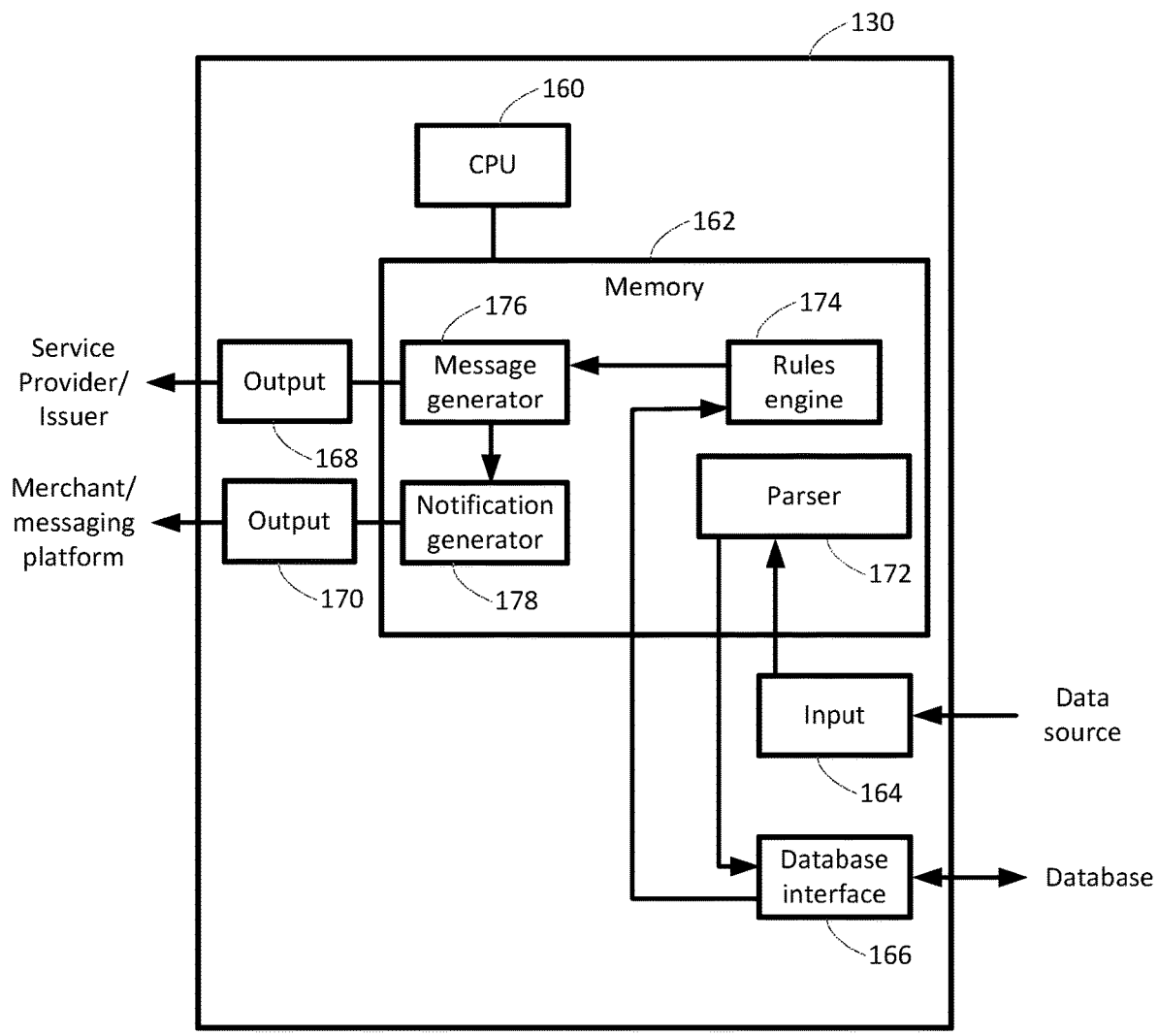
FIG. 4 is a block diagram illustrating a monitor in accordance with the current disclosure.

FIG. 4 is a block diagram of one embodiment of the monitor 130. The monitor 130 may include a central processing unit (CPU) 160 that executes code store in a memory 162. The monitor 130 may also include an input 164 coupled to a data source that provides transaction settlement and clearing messages. One such data source may be the service provider 114. The input 164 may include hardware and firmware that signal level interfaces, handshaking, message protocol, error management, etc. In an embodiment, the input may be an IEEE 802.x network interface card, such as those available from Intel Corporation or similar products. In an embodiment, the parser 172 may receive a stream of settlement and clearing messages and process those messages into data elements including, but not limited to a transaction identifier, customer PAN, merchant identifier, location identifier (if location restrictions apply), and transaction value. This data extraction and formatting process may also involve excluding various transaction types that may not be relevant to the target transaction, such as ATM withdrawals, etc. Additional transactions may be screened at a high level. For example, the parser 172 may exclude transactions from countries where such a process may be prohibited.

The results from the parser 172 may be provided to a database interface 166 that may formulate queries to the database 133 and receive search results. The queries may simply look for a dataset that match a union of merchant ID, customer PAN, and a positive credit value. When a single match is found, the results may be passed to a rules engine 174. The database interface 166 may also handle both expected responses and error conditions, such as no match and multiple matches, respectively. In the latter case, some error resolution process may be entered or the transaction may be flagged for later follow up.

The rules engine may further qualify the transaction, e.g., confirming that the transaction is within a prescribed date range. The rules engine 174 may also calculate the discount to the transaction, taking into account the effect of local taxes or other discounts already applied. The rules engine 174 may also calculate the reduction in stored credit for the PAN and generate the database transaction for use by the database interface 166 to make the update. In general, the full amount of stored credit may be applied to a transaction up to the amount of the purchase. If the transaction value is less than the full amount of stored credit, the amount of the transaction may be deducted from the stored value amount and the database updated with the remaining value. In some cases, special rules may be enforced such as the reduction is valid on a single purchase only so that if the transaction value is less than stored value amount, the remaining stored value may simply be discarded. Other rules may include day-of-the-week restrictions that, for example, a restaurant may impose.

A message generator 176 may receive transaction data from the rules engine 174 for use in generating transaction messages that actually cause the credit to be applied to the transaction, either as an instant discount or as a settlement message. These messages may be queued and sent via an output 168 that manages the message protocol including confirmations and errors. The message generator 176 may also communicate with a notification generator 178 responsive to successful application of a credit to a transaction. The notification generator 178 may format one or more messages that ultimately are sent to the customer. The messages may include email, text messages, social media posts or combinations of these and others. The output 170 may handle protocols and other message management-related tasks.

In an embodiment, for larger or more media-savvy companies the message may be sent to the messaging system 136 of the merchant platform 122 so that the merchant can manage the delivery and branding of the information about use of the stored value. For other perhaps smaller or less sophisticated merchants, in another embodiment, the notification generator 178 may directly communicate a stored credit discount message to the customer via one of more of the message channels. In such an embodiment, the notification generator 178 may publish an application programming interface (API) or allow other access that enables the merchant to manage the branding of the message without carrying the overhead of a separate messaging system 136.

The notification generator 178 may prepare customer notifications indicating when value is added to an open loop card as well as when value is applied to a transaction. In an embodiment, the customer may be able to communicate a message to the notification generator 178 which triggers a response with the remaining balance of the store credit associated with one or all merchants. For example, the customer may simply text "balance" to the notification generator 178 to receive the remaining value for all merchants with outstanding balances. In another embodiment, the customer may text or otherwise message either the merchant's messaging system 136 or communicate a text with "merchant_name" to the notification generator 178 to receive in response a balance for that specific merchant. Logically, the notification generator 178 may also operate according to a published API for efficient and reliable results.

Figure 5:
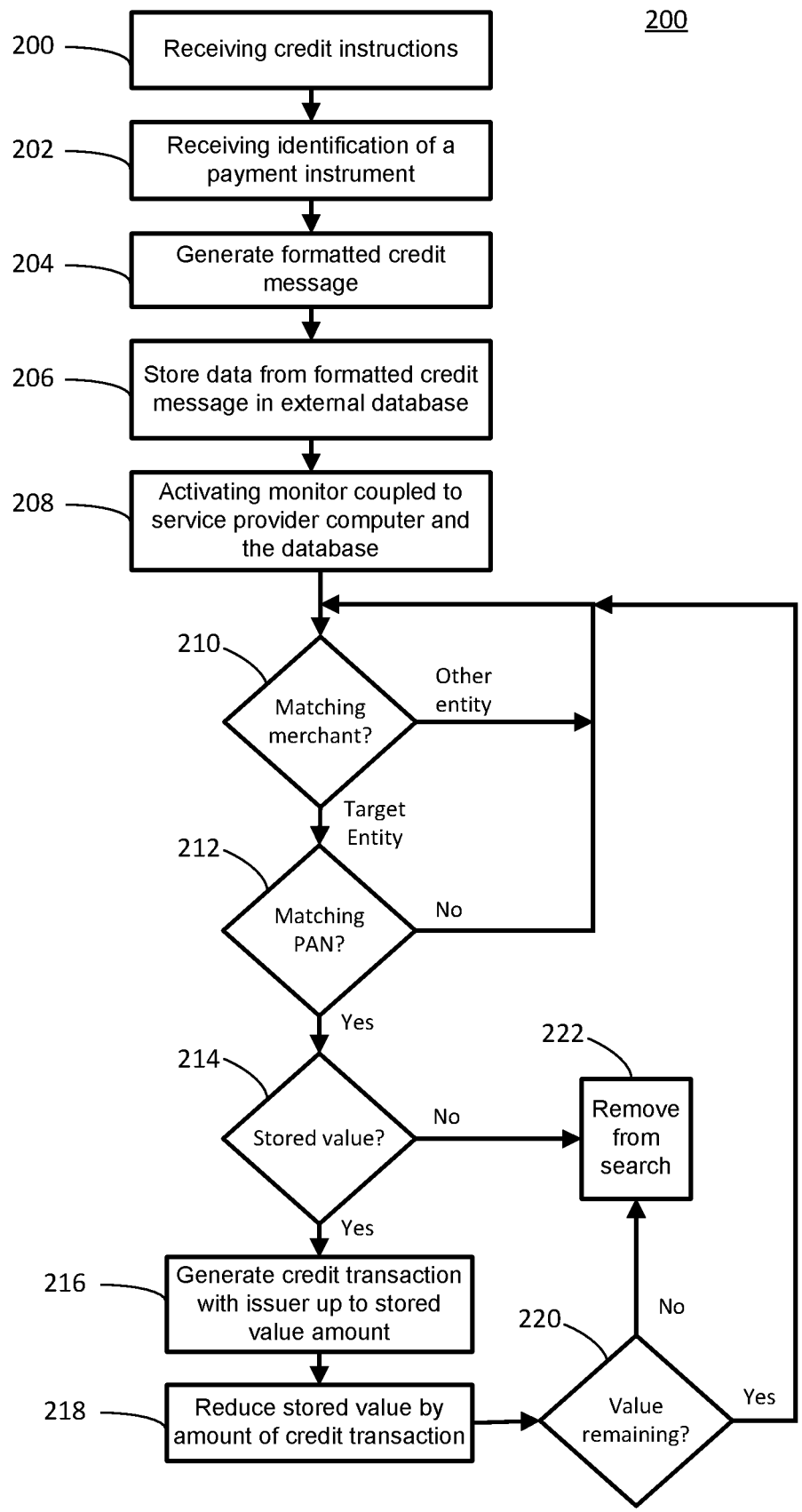
FIG. 5 is a flowchart of a method of managing store credit in accordance with the current disclosure.

FIG. 5 is a flow chart of an exemplary method of managing store credit as a cashless credit, for a user. At block 200, a store credit instruction may be received via, for example, a customer service terminal 124. In one embodiment, the customer service terminal 124 may be in a retail environment but in another embodiment, the customer service terminal 124 may be in a telephone center or other customer service support environment. The store credit instruction may include an amount of store credit to be applied and any rules for use such as a merchant or merchant brand at which the store credit may redeemed. In an embodiment, at block 202, the customer's open loop card identifier may be physically read using a card device 152 or may simply be entered via a user interface of the customer service terminal 124. The card number may be a customer card's PAN or may be a token entered, for example, via a token device such as Apple Pay.

After the credit instructions and open loop card identifier are captured, a credit message may be formatted at block 204 and sent to a downstream partner. At block 206, the downstream partner may identify the message and store the credit message information, for example, in a database 133. Once a store credit has been entered, at block 208 a monitor 130 may be activated to screen transactions processed by the service provider 114 in order to identify those transactions that qualify for application of store credit.

At block 210, transactions being processed by the service provider 114 may be reviewed and analyzed for content, in this case, for merchants for whom store credit has been instantiated. That is, any transaction involving a merchant that is holding store credit may cause the process to continue to block 212, while a merchant that does not hold store credit may cause the process to loop back to review another transaction. At block 212, a check may be made to determine that the PAN associated with the transaction matches a PAN for which stored credit is available. If so processing may continue at block 214, if not, processing may return to block 210. Any additional filters for application of the store credit such as, but not limited to, specific merchant brand, items purchased (e.g., not all items may be eligible for store credit), time of day or day of week. As may be apparent, the order of steps 210 and 212 may be changed or the screening process may be implemented in block so that only one test is made.

A determination of stored value may be made at block 214. At this point a check for positive value may be made including commitments on current funds not yet settled. When value exists, processing may continue at block 216. In some embodiments, the remaining value may also be communicated. When no value exists, at block 222, the account may be removed from the search space so that the PAN is no longer screened for that merchant. In addition, in some embodiments, a notification of no balance may be communicated.

At block 216, the monitor 130 may generate a credit for the PAN up to the value of either the transaction or the store credit remaining for that PAN. If an amount of store credit exceeds the value of the transaction, the store credit value may be reduced by the amount credited in the transaction. If value remains at block 220, processing continues at block 210. If no store credit remains, execution continues at block 222 and the PAN is removed from the search space as discussed above.

A technical effect may be the addition of the monitor 130 to the prior art payment processing system, including the parser 172, rules engine 174 and notification generator 178. These capabilities may expand the functionality of the prior art system with features and functions supporting the application and use of store credit linked to an open loop card. Another technical effect may be the physical and programmatic changes to a prior art systems resulting in the customer service terminal 124.

The use of the system 120 benefits both merchants and customers. Merchants may be able to improve the customer experience of refunds and other store credits while receiving other tangible benefits such as retention of funds until an actual refundable transaction is settled. Further, the merchant no longer needs to pay a separate pre-paid card issuer 116 for accepting and managing the store credit value. This may not only improve cash flow but may also reduce escheatment issues associated with unused funds. Fraudulent refunds may be reduced when perpetrators are faced with enrolling value with either their own card, allowing them to be tracked, or another person's card such that the value may not be accessible.

Customers may benefit by eliminating the need to remember to carry and use separate stored value cards or receipt codes. The customer also has reduced concerns associated with lost or stolen stored value cards because the value is associated with his or her credit card account, not the card itself so that even the loss of the open loop card may not result in loss of stored value. That is, a newly issued replacement card may simply have the store credit balance moved to the new card.

The figures depict preferred embodiments for purposes of illustration only. One skilled in the art will readily recognize from the following discussion that alternative embodiments of the structures and methods illustrated herein may be employed without departing from the principles described herein Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

We claim:

1. A method of providing refunds to a user by an entity, the method comprising:

receiving, by a central processing unit (CPU) of a customer service terminal of the entity, data corresponding to a credit amount to be refunded to the user;

receiving, at the customer service terminal, identification of a payment instrument of the user;

generating, at the customer service terminal, a formatted message containing data including an identifier of the entity, the credit amount to be refunded to the user, and the identification of the payment instrument of the user;

communicating the formatted message from the customer service terminal to a service provider via a network coupled between the customer service terminal and an input of the service provider, the service provider associated with the payment instrument of the user;

storing the data associated with the formatted message in a database to provide stored credit information associated with the payment instrument of the user, storing the data associated with the formatted message in the database comprising creating a user account and associated ledger;

activating a monitor coupled to the service provider and the database;

determining, via the monitor, an occurrence of a purchase transaction with the entity;

comparing, via the monitor, an identification of a payment instrument involved in the purchase transaction with the data stored in the database to determine whether the identification of the payment instrument involved in the purchase transaction matches the identification of the payment instrument in the stored credit information, a refund being available to apply to the purchase transaction if the match is found; and applying to the purchase transaction, via the monitor, the refund up to the credit amount when the refund is available.

2. The method of claim 1, wherein receiving data corresponding to the credit amount comprises receiving the data via user interface of the customer service terminal.

3. The method of claim 1, wherein applying, via the monitor, the refund comprises applying the refund during a billing cycle of the payment instrument.

4. The method of claim 1, wherein applying, via the monitor, the refund comprises applying the refund using a real time reduction in the purchase transaction.

5. The method of claim 1, further comprising updating a remaining value in the database after reducing a starting value of the credit amount by the refund applied to the purchase transaction.

6. The method of claim 1, further comprising generating and communicating to the user a signal indicating one of creating the credit amount, application of value from the credit amount to the purchase transaction, or exhaustion of the credit amount.

7. The method of claim 6, wherein communicating the signal indicating application of the credit amount comprises communicating the signal from the monitor to the entity.

8. The method of claim 7, further comprising, communicating, from the entity to the user, a second signal indicating application of the credit amount to the purchase transaction.

9. The method of claim 8, wherein the communicating the second signal comprises one of communicating a text message to the user or posting a social media message to the user.

* * * * *